4/8/86 XR 4,581,634

United States Patent [19]

Williams

[11] Patent Number: 4,581,634

[45] Date of Patent: Apr. 8, 1986

[54] SECURITY APPARATUS FOR CONTROLLING ACCESS TO A PREDETERMINED AREA

[76] Inventor: Jarvis L. Williams, 4452 Ardmore Ct., Bloomfield Hills, Mich. 48013

[21] Appl. No.: 442,579

[22] Filed: Nov. 18, 1982

[51] Int. Cl.[4] .................................... H04N 7/18

[52] U.S. Cl. .................................... 358/108; 358/86

[58] Field of Search .......................... 358/108, 210, 86

[56] References Cited

U.S. PATENT DOCUMENTS

| | | | |
|---|---|---|---|
| 2,481,082 | 9/1949 | Chew | 95/44 |
| 2,914,746 | 11/1959 | James | 340/149 |
| 3,217,098 | 11/1965 | Oswald | 358/183 X |
| 3,482,037 | 12/1969 | Brown et al. | 176/6 |
| 3,564,132 | 2/1971 | Baker | 178/6 |
| 3,564,132 | 2/1971 | Baker et al. | 358/108 |
| 3,612,764 | 11/1971 | Gilkeson et al. | 358/108 |
| 3,701,100 | 10/1972 | Yarbrough | 340/149 |
| 3,701,100 | 10/1972 | Yarbrough | 358/108 |
| 3,814,841 | 6/1974 | Ulicki | 358/86 |
| 4,054,910 | 10/1977 | Chou et al. | 358/86 |
| 4,310,855 | 1/1982 | Holzgrafe | 358/210 |

*Primary Examiner*—Howard W. Britton
*Assistant Examiner*—Victor R. Kostak
*Attorney, Agent, or Firm*—Basile, Weintraub & Hanlon

[57] ABSTRACT

A face badge reader is located in proximity with a lockable closure allowing access to a predetermined area and includes a first camera for scanning an individual's face, a receptacle for receiving an identification badge bearing the individual's photograph and a second camera for scanning the badge. The video signals are transmitted to a remotely located monitor for viewing comparison. The face badge reader receives inputs from sensor switches and push buttons and includes control devices for energizing a door strike release mechanism associated with the closure for unlocking the closure. A remotely located controller controls the selective unlocking of the closure and camera selection. The face badge reader and the controller include transmitters and receivers which communicate via digitally encoded control signals.

14 Claims, 7 Drawing Figures

SECURITY APPARATUS FOR CONTROLLING ACCESS TO A PREDETERMINED AREA

BACKGROUND OF THE INVENTION

1. Field of the Invention:

This invention relates, in general to security systems and, specifically, to security systems for controlling the access of a single individual into a predetermined area and, even more specifically, to security systems for controlling access to a pre-determined area based on a video comparison of an individual's face and photograph on an identification badge.

2. Description of the Prior Art

Security systems have been devised to control the passage or access of people into and out of homes, buildings and factories so as to prevent unauthorized entry and to maintain control over the number of people entering and leaving such facilities. Previously, human guards have been positioned at each entrance of a building or factory in order to manually screen people entering and leaving the building by a variety of methods, i.e., personal recognition or sight identification of a badge, identification card, etc. While effective, positioning a guard at each entrance is cost prohibitive in buildings having a large number of entrances since one guard must be maintained at each entrance for extended periods, sometimes on a twenty-four hour basis.

In an effort to reduce security costs, automatic or semi-automatic security systems have been devised to automatically control access to a building or factory. Such systems typically mount a camera adjacent each building entrance which transmits an image of an individual requesting entrance into the building to a centrally located control station where a single guard makes a decision based upon personal recognition and/or conversation with the individual via speakers.

Cameras have also been combined with badge or identification card readers which are located at each building entrance to provide a more positive identification of individuals requesting entrance to a building. Such face badge readers receive an individual's identification card bearing his photograph. A camera mounted in the face badge reader scans the card and transmits a video image of the photograph on the card is compared by the guard with an image of the individual's face which is transmitted from a second camera also located at the building entrance.

While such systems provide positive identification of an individual before ingress or egress is permitted and substantially reduce the number of individual guards required to survey all entrances into a building, they are not without drawbacks.

In such previous devised video based identification systems, individual wires are connected between each control device at each building entrance, such as door strikes, camera movement controls, call pushbuttons, speakers, etc., and the central control unit. In buildings having a large number of entrances, the large number of wires run from each entrance to the central control unit increases the cost of the security system and reduces its flexibility since additional control devices which may be added in the future at each building entrance require additional wiring. Furthermore, the circuit elements in the central control unit required to receive and handle each control signal from a plurality of entrances result in a large, complex and expensive central control unit.

Thus, it would be desirable to provide a security system for controlling access of an individual into a pre-determined area which overcomes the problems attendent the use of previously devised building access security systems. It would also be desirable to provide a security system which includes minimal wiring connections between security and control devices located at each building entrance and a centrally located control unit. It would also be desirable to provide a security system for controlling access into a pre-determined area which can be easily modified to handle additional security devices. Finally, it would be desirable to provide a security system for controlling access into a pre-determined area which is easily adaptable for controlling multiple building entrances.

SUMMARY OF THE INVENTION

There is disclosed herein a security apparatus for controlling the access of an individual having an identification badge bearing the individual's photograph through a lockable closure or door into a pre-determined area. The security system includes a face badge reader having a first video scanning means or camera located in the proximity with the first closure for scanning and providing a video image of the individual requesting entrance. Means are provided for receiving the identification badge of the individual. A second video scanning means or camera scans the identification badge and provides a video image of the individual's photograph contained on the badge. Means are provided for releasably locking the first closure member. A remotely located monitor means is connected to the first and second cameras and displays the video output of the first and second cameras. A control means is provided for selectively operating the locking means on the first closure member. Finally, the face badge reader and the control means each include digital encoded signal transmitting and receiving means for communicating control signals therebetween in a digitally encoded manner.

In a preferred embodiment, the face badge reader is located within an enclosure suitable for the entry of a single individual through a first lockable closure. A second lockable closure is provided in the enclosure for allowing access to the pre-determined area. Door strike control devices are associated with each closure or door to controllably unlock each door. Call push buttons and individual speakers are mounted exteriorly adjacent each door and are connected along the door strike control devices to the face badge reader. Activating either call push button inputs a control signal to the face badge reader which transmits such signals in a digitally encoded manner to the remotely located control means. An operator, such as a guard, activates the door speaker to converse with the individual requesting access and unlocks the door allowing access of the individual into the enclosure.

Once in the enclosure, the individual inserts his identification badge into a receptacle in the face badge reader. Video signals from first and second cameras mounted within the face badge reader transmit the image of the individual's face and photograph on the identification card to the remotely located monitor which displays one or both video signals to the guard.

If identification of the individual is positive, the guard activates a push button on the control means which transmits a digitally encoded signal corresponding to such push button to the face badge reader which decodes the signal and activates the door strike unit unlocking the door and allowing the individual to enter the pre-determined area. In this manner, control of individuals who can enter and depart from a pre-determined area is maintained.

By using digitally encoded transmitter and receiver means in the face badge reader and the control unit, the number of individual wires which must be connected between the face badge reader and the remotely located control unit is minimized thereby decreasing the overall cost of the security system and increasing its flexibility since additional control devices, such as cameras, sensors, etc., can be added without requiring additional wiring connections between the face badge reader and the control unit. Furthermore, the control unit can handle a plurality of face badge reader units so as to enable a single unit to control the access of individuals through a plurality of entrances in a building.

BRIEF DESCRIPTION OF THE DRAWING

The various features, advantages and other uses of the present invention will become more apparent by referring to the following detailed description and drawing in which.

DESCRIPTION OF THE PREFERRED EMBODIMENTS

Figure 1:
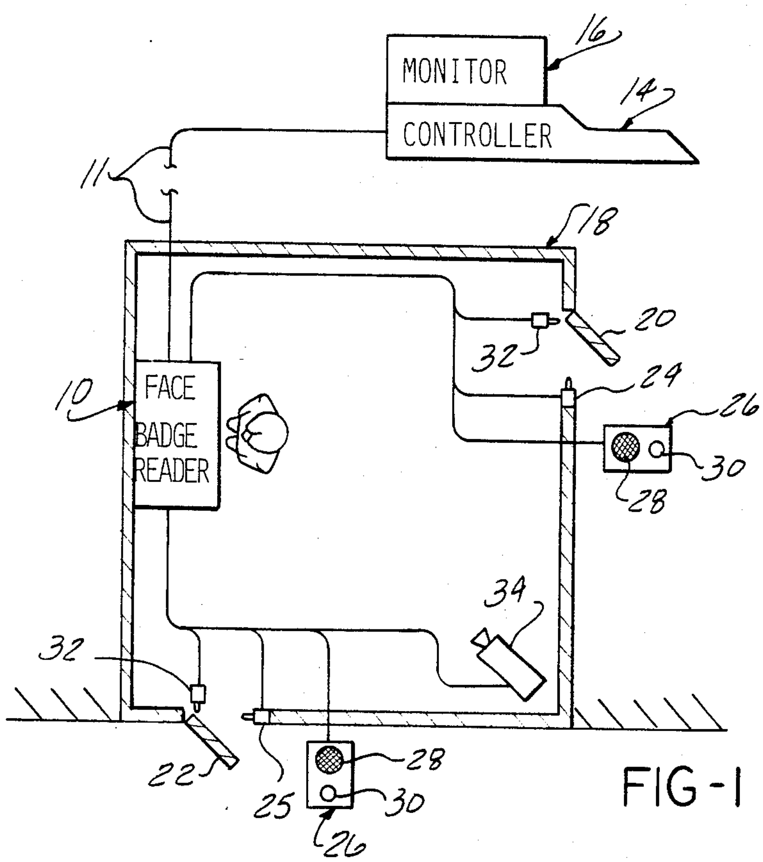
FIG. 1 is a pictorial representation of a security apparatus constructed in accordance with one embodiment of the present invention.

Throughout the following description and drawing, an identical reference number is used to refer to the same component shown in multiple figures of the drawing.

Figure 2:
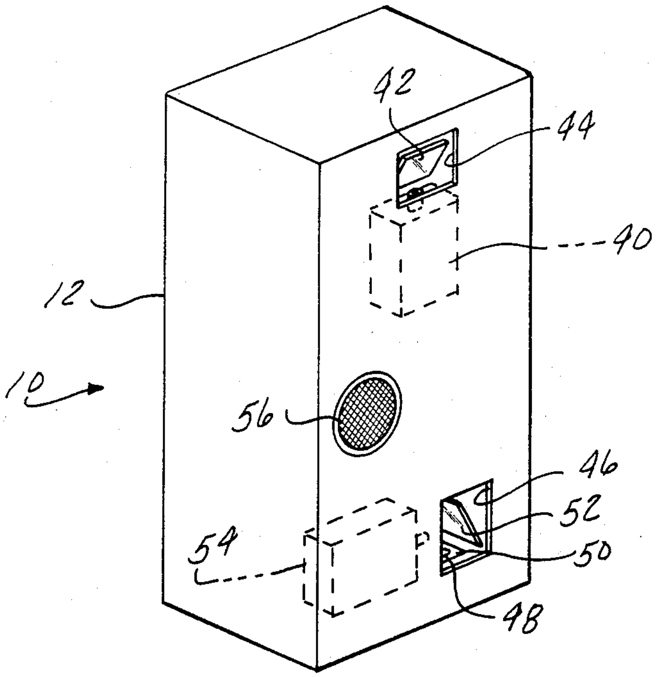
FIG. 2 is a perspective view of the face badge reader shown in FIG. 1.

Referring now to the drawing, and in particular, FIGS. 1 and 2, there is illustrated a security apparatus which is suitable for controlling the access of an individual into a pre-determined area, such as a home, building or factory. The security apparatus includes a face badge reader 10 which is mounted in proximity with a lockable closure, such as a door. The face badge reader 10 is connected via wires 11 to a remotely located control means or controller 14 and a monitor 16.

Although the face badge reader 10 may be mounted adjacent an exterior door or entrance to a building, in a preferred embodiment, the face badge reader 10 is located within an enclosure or space 18. The enclosure 18 may be a separate enclosure which is positioned exteriorly from a building or factory or it may constitute an entrance within the building itself.

As shown in FIG. 1, the enclosure 18 includes four walls and is preferably sized for receiving only a single individual at a time. First and second doors 20 and 22, respectively, are mounted within the walls of the enclosure 18; with the first door 20 controlling access to the pre-determined area, such as a building interior, and the second door 22 permitting ingress or egress to the interior of the enclosure 18. Each of the first and second closures 20 and 22 is releasably lockable. Preferably, a solenoid operated door strike mechanism 24 and 25 is mounted adjacent each door 20 and 22, respectively, and enables each door 20 and 22 to be locked or unlocked as desired.

Further, as shown in FIG. 1, a call box 26 is mounted adjacent each door, preferably on the exterior of the enclosure 18. Each call box 26 includes a speaker 28 and a call or address push button 30. The speaker 28 permits two way conversation between an individual requesting access to the pre-determined area or enclosure 18 and a guard. The call button 30 alerts the guard that an individual is requesting entrance into the enclosure 18. Additionally, sensor switches 32 are associated with each door 20 and 22 to sense whether either door 20 and 22 has been opened. Further, as described in greater detail hereafter, a video scanning means, such as a camera 34, is mounted within the interior of the enclosure 18 for providing a visual image of the interior of the enclosure 18.

As shown in FIG. 2, the face badge reader 10 constitutes an enclosure 12 in which is mounted a first video scanning means, such as a camera 40. The camera 40 is positioned such that its lens faces a movable reflector mirror 42 which is movably mounted within a receptacle 44 formed in one surface of enclosure 12. In this manner, the mirror 42 reflects images, such as the face of an individual confronting the face badge reader 10, into the lens of the camera 40 for transmission to the remotely located controller 14, as will be described hereafter. Although not shown, the receptacle 44 may be covered by a oneway glass to protect the mirror 42 and camera 40 mounted within the enclosure 12.

A second receptable 46 is also formed in the enclosure 12. The receptacle 46 is adapted for receiving an identification card or badge 48 which bears the photograph 50 of the individual requesting entrance into the pre-determined area. A mirror 52 is mounted within the receptacle 46 to reflect the image of the identification badge 48 into a second video scanning means or camera 54 which is also mounted within the enclosure 12. The second camera 54 is adapted for transmitting the video image of the photograph on the identification card 48. Finally, a two-way speaker 56 is mounted in the enclosure 12 for permitting conversation between a remotely located guard and the individual requesting entrance into the enclosure 18.

Additional components and circuits, described in greater detail hereafter, are also housed within the enclosure 12 of the face badge reader 10. These components are connected via wires 11 to a remotely located control means or controller 14. The controller 14 is configured to control the unlocking of the closure members or doors 20 and 22 as well as performing additional functions, such as rotating the mirror 42 in the face badge reader 10.

A monitor means 16 is mounted in proximity with the controller 14. The monitor 16 preferably constitutes a conventional television screen and is connected via a co-axial cable to the first and second cameras 40 and 54 in the face badge reader 10 as well as the overhead camera 34 mounted within the enclosure 18 for displaying to a guard or security individual the image transmitted by the various cameras.

According to a preferred embodiment of the present invention, communication between the controller 14 and the face badge reader 10 over wires 11 is performed via digitally-encoded transmitting and receiving techniques. Both of the controller 14 and face badge reader 10 includes transmitting and receiving means which are adapted for transmitting the various control signals in a digitally encoded manner so as to minimize the number of wires needed to connect the controller 14 to the face badge reader 10.

Figure 3:
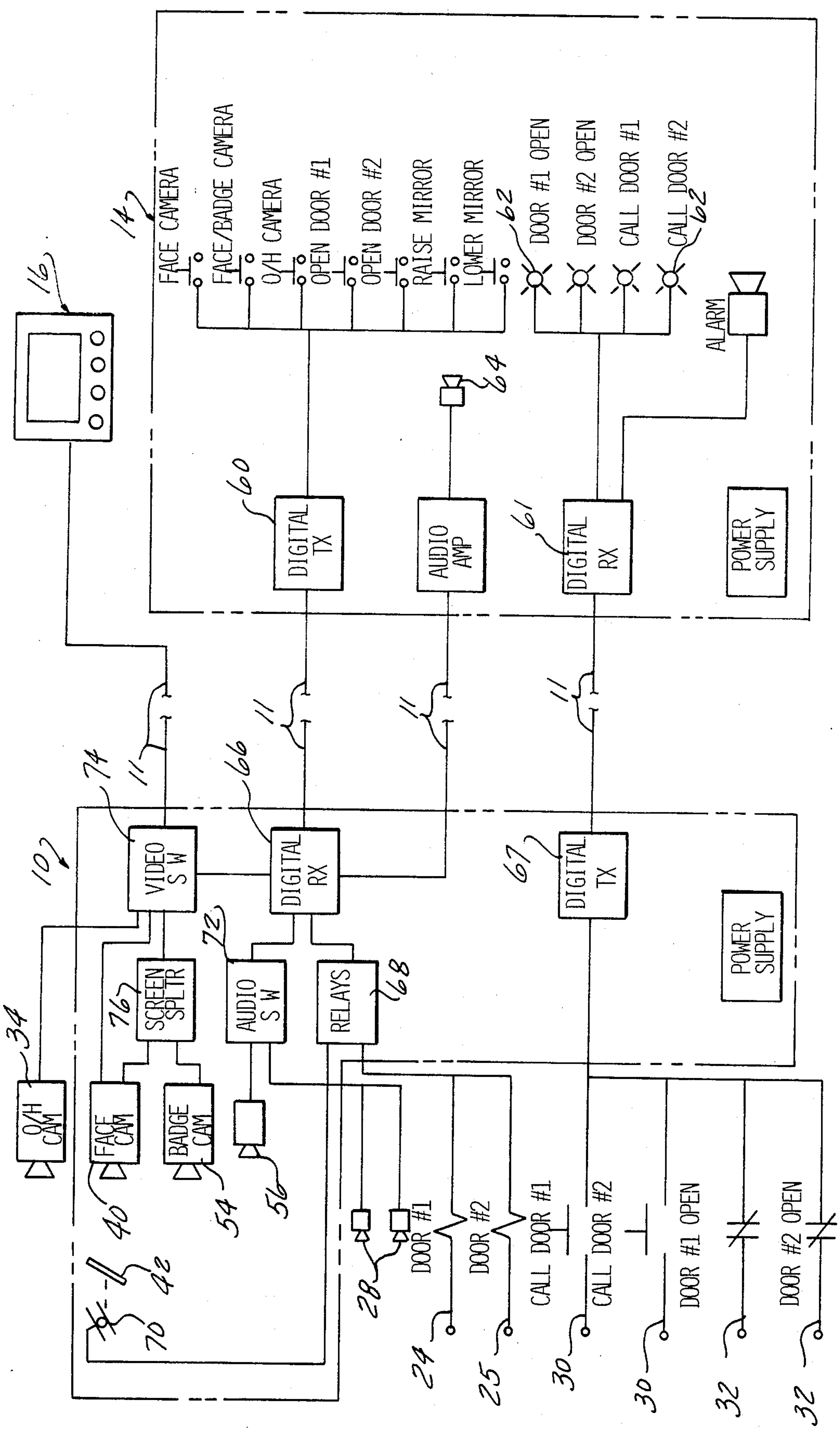
FIG. 3 is a block diagram depicting the major components and connections of the control unit and face badge reader of the present invention.

Referring now to FIG. 3, there is illustrated a block diagram of the various operational components forming the controller 14 and the face badge reader 10. As shown in FIG. 3, the controller 14 includes a digital transmitting means 60 which receives signals from various input devices, such as command push button, which are mounted on the controller 14. Push buttons are provided for selecting which camera 40, 54 and 34 is selected for viewing on the monitor 16, as well as unlocking the doors 20 and 22 in the closure 18 and raising and lowering the mirror 42 mounted in the face badge reader 10. The digital transmitting means 60 functions to receive the inputs from the command push buttons, digitally encodes a transmission signal indicating which input has been activated and transmits the digitally encoded signal to the face badge reader 10.

The controller 14 further includes various indicating means or lights 62 which, in a preferred embodiment, indicate whether one of the doors 20 and 22 is opened or when a call has been received. A speaker 64 is also provided and is connected to the speaker 56 mounted in the face badge reader 10 for providing two way communication between the guard operating the controller 14 and the individual confronting the face badge reader 10.

The digitally encoded signal generated by the digital transmitting means 60 in the controller 14 is transmitted via two wires 11 to a digital receiving means 66 mounted in the face badge reader 10. The digital receiving means 66 decodes the transmitted signal and energizes the appropriate control device. The digital receiving means 66 is connected to an output switch, such as relays 68, which, when energized, activate the appropriate output device, such as the door strike solenoids 24 and 25 so as to unlock the doors 20 and 22, respectively. In addition, the relays 28 connect power to a motor, shown symbolically by reference number 70 in FIG. 3, which controls the raising and lowering of the mirror 42 mounted within the face badge reader 10.

The digital receiving means 66 in the face badge reader 10 is also connected to an audio switch 72 which selects which of the speakers 56 and 28 is selected for communication with the operator of the controller 14. Finally, the digital receiving means 66 is connected to a video switch 74 which selects which of the cameras 34, 40 and 54 is operative for video transmission to the monitor 16.

Also, conventional screen splitter circuit 76 is mounted within the face badge reader 10 for prodicing simultaneous transmission of video signals from the cameras 40 and 54 in the face badge reader 10 so as to provide on the monitor 16 simultaneous, side-by-side images of the face of the individual confronting the face badge reader 10 and the photograph 50 on the individual's identification card 48 which is received in the receptacle 46 in the face badge reader 10.

Figure 4:
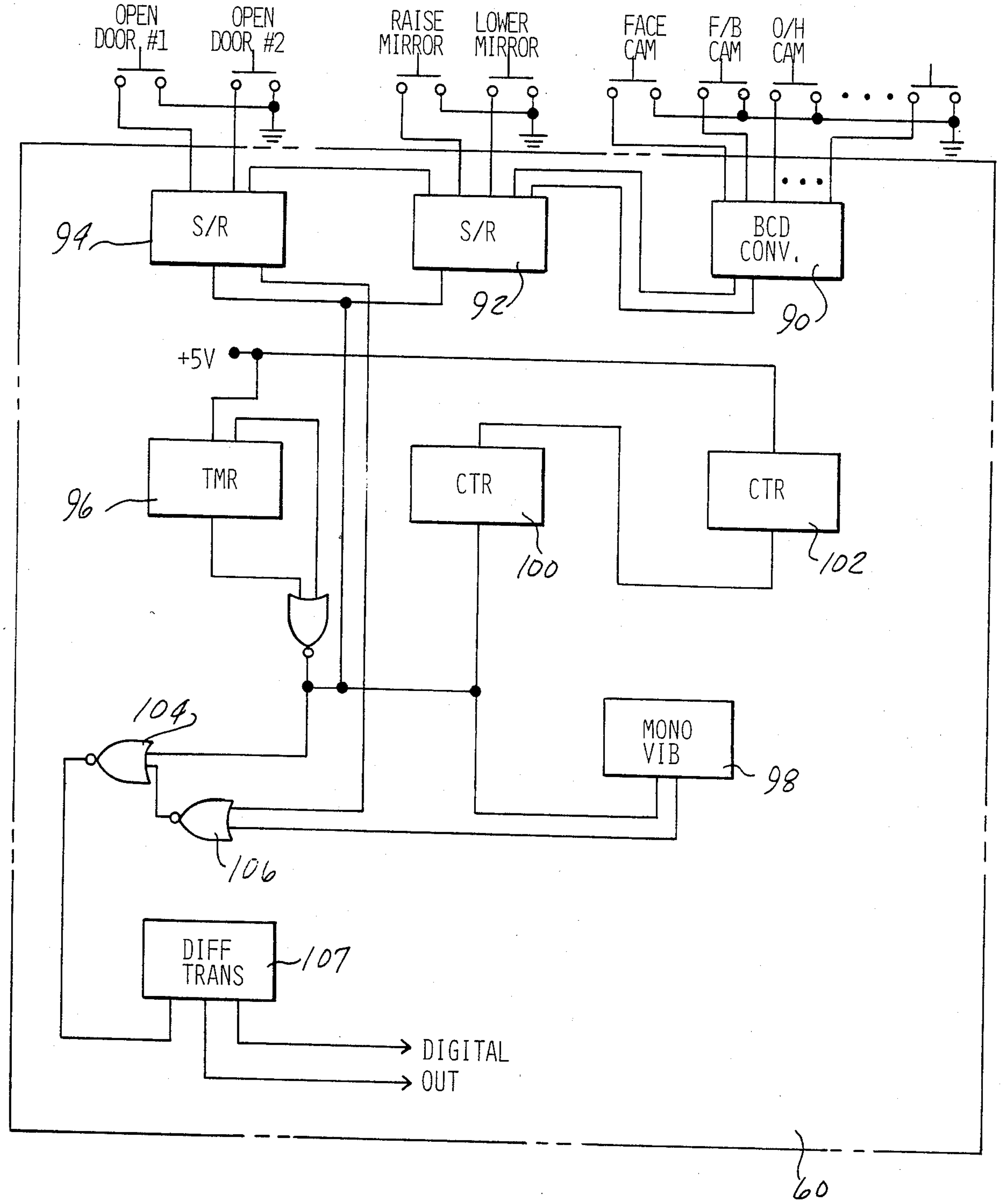
FIG. 4 is a block diagram of the control unit transmitter.

Referring now to FIG. 4, there is illustrated a detailed block diagram of the circuitry used in forming the digital transmitting means 60 in the controller 14. The digital transmitting means 60 receives inputs from command push buttons mounted on the controller 14, such as command push buttons indicating which doors are to be opened, push buttons for controlling the position of the mirror 42 in the face badge reader 10, as well as which camera is selected for viewing on the monitor 16. The camera command push buttons are input to a BCD converter 90 which outputs a coded signal indicating which of the cameras 34, 40 and 54 is selected for viewing. The output of the BCD converter 90 is input to one of two serially connected shift registers 92 and 94 which also receive the other command push button inputs. The shift registers 92 and 94 provide a serial output whose successive pulses or bits correspond to a sequential indication of which of the command push button(s) has been activated.

The digital transmitting means 60 outputs a constant 3200 Hz signal which is comprised of 16 groups of 16 messages. While 256 pulses are transmitted in each groups of pulses, only the first seven are utilized in the illustrated embodiment of the present invention for transmitting information corresponding to which command push button has been selected. A sync pulse generated by a timer 96 occurs at the beginning of each new count of 256 pulses.

A monovibrator 98 outputs a pulse train at the 3200 Hz rate. The output of the monovibrate 98 is input to two serially connected counters 100 and 102 which are reset to zero at the completion of each count of 256.

Figure 5:
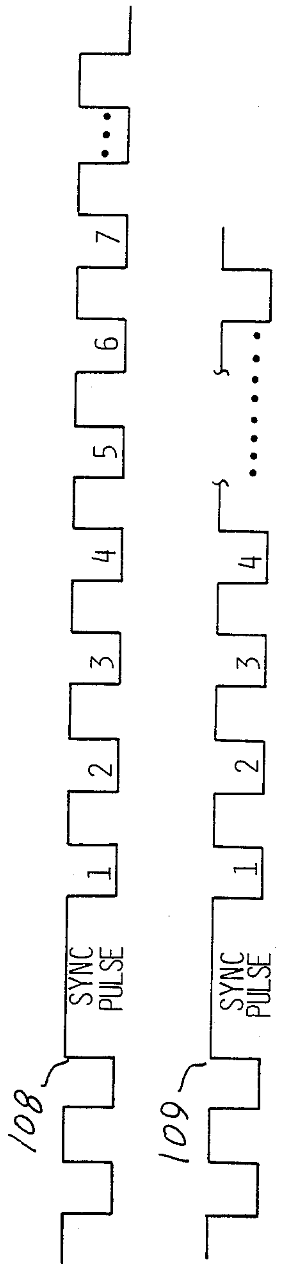
FIG. 5 is a diagram depicting the digitally encoded pulses transmitted by the control unit and the face badge reader.

When a command push button is activated, the pulse relating to that button expands by approximately 50% to indicate the activation of that command push button. The receiver 66 in the face badge controller 10, as described hereafter, detects the expanded pulse width and initiates the appropriate action. Thus, when a command push button is activated, the shift registers 92 and 94 will output a serial pulse train in which one or more of the first seven bits will be expanded to indicate the activation of the corresponding command. Although 256 bits are generated in each group, only the first seven, as shown in pulse train 108 in FIG. 5, are assigned to specific functions. Thus, but 1 is a command to open door 20 in the enclosure 18, bit 2 is associated with opening door 22, etc. This output pulse train is clocked through NAND gates 104 and 106 by the monovibrator 98 to a differential transceiver 107 which outputs the digital signals.

Figure 6:
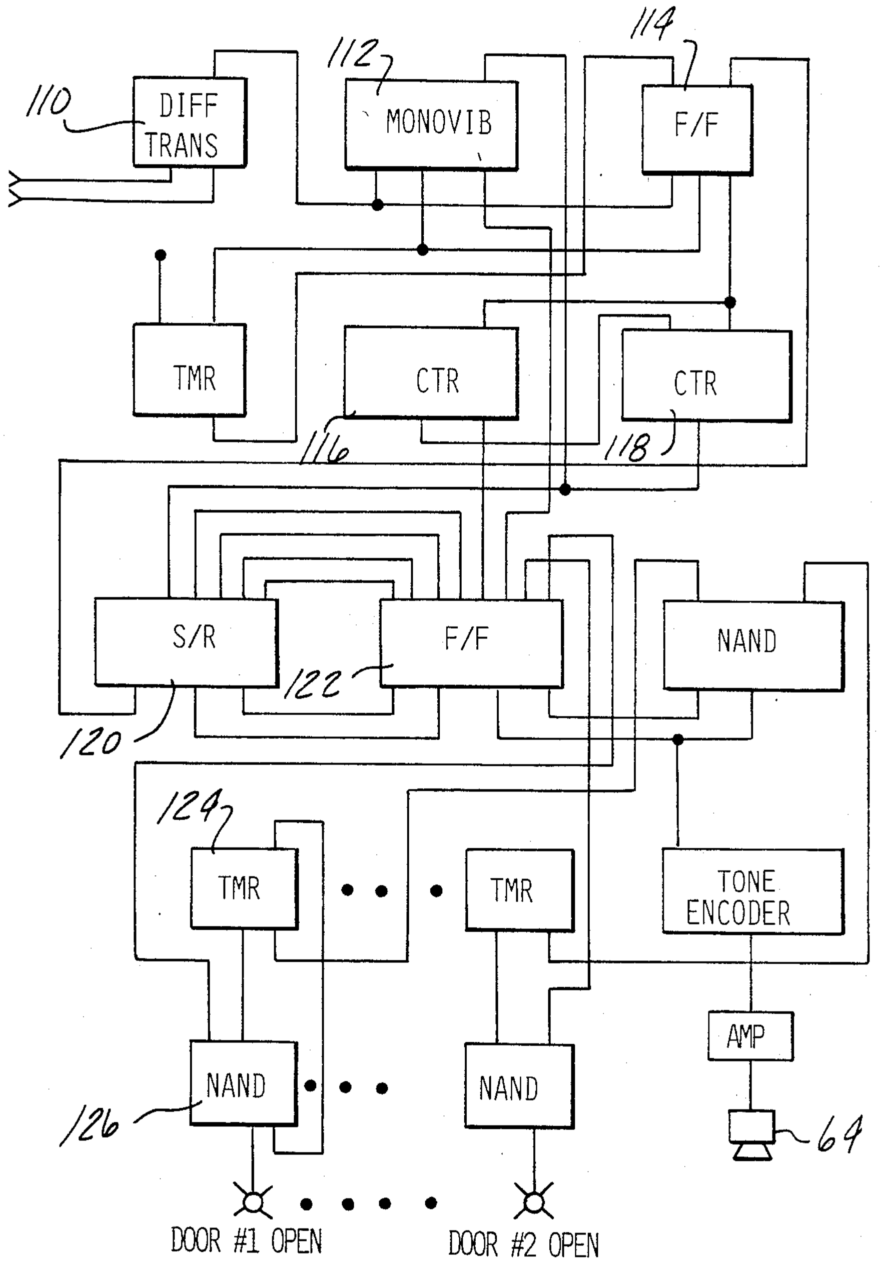
FIG. 6 is a block diagram of the control unit receiver.

The controller 14 also includes digital receiving means 61, FIG. 3, which are operative to receive the digitally encoded signals from the digital transmitting means 67 contained within the face badge reader 10. The signals corresponding to certain inputs, such as an open door in the enclosure 18 or the activation of a call push button 30 at one of the doors 20 or 22, are encoded by the digital transmitting means 67 in the face badge reader 10 and input to a differential transceiver 110 in the controller 14, FIG. 6, which activates a monovibrator 112 and clocks the serial pulse train through a flip flop 114. The output pulses from the flip flop 114 are input to two serially connected counters 116 and 118 which reset to zero at the completion of each 256 group of pulses. The actual data or state of each pulse output from flip flop 114 is input to a shift register 120 which is of the serial in-parallel out type. Digital outputs from the shift register 120 are input to a buffer register or flip flop 122 which then outputs each digital output to a timer 124 and NAND gate 126 to activate the appropriate control device, such as indicator lights indicating which input has been activated at the face badge reader 10. In this manner, indications of which actions have transpired at the face badge reader 10 are present at the controller 14.

Figure 7:
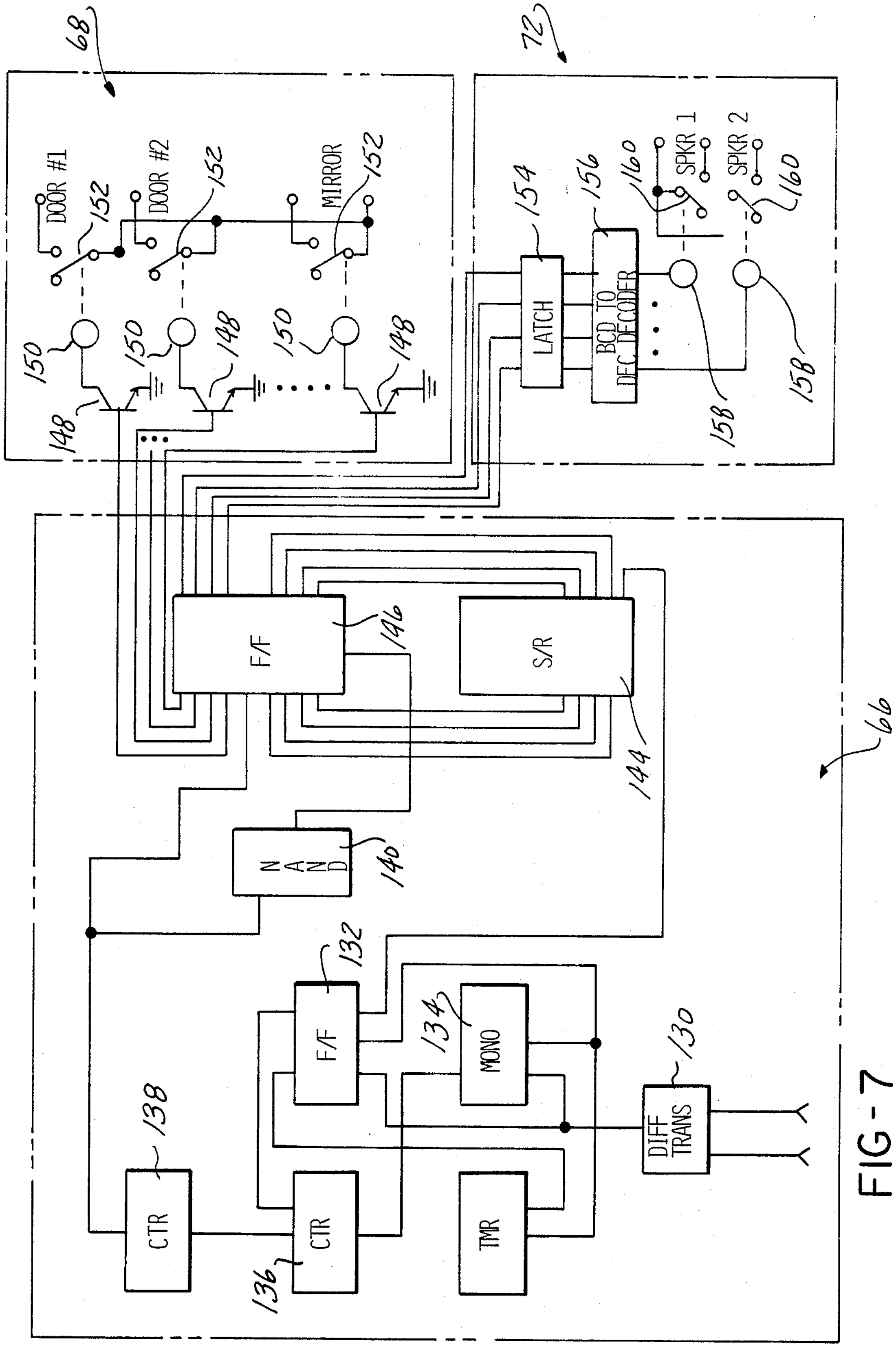
FIG. 7 is a block diagram of the face badge reader receiver, relay and audio switch means.

The digitally encoded signals from the digital transmitting means 60 in the controller 14 are input to a digital receiving means 66 in the face badge reader 10. As shown in FIG. 7, the signals are input through a differential transceiver 130 in serial form, clocked through a flip flop 132 and are input to a shift register 144. The shift register 144 transfers the serial data to a parallel form which, through flip flops 146, is connected to the base of a plurality of transistors 148 in the relay means 68 in the face badge reader 10. Each transistor 148 is connected to the coil of a relay 150 which controls a movable contact 152 switchable between open and closed states. When the appropriate relay 150 is energized, its associated contact 152 is switched to a closed state thereby applying power to the appropriate control device, such as the door strike solenoids 24 and 25 or the motor 70 for raising and lowering the mirror 42 in the face badge reader 10.

In addition, the outputs from the flip flop 146 are input through a latch 154 to a BCD to decimal decoder 156. The decimal output from the decoder 156 is applied to individual relays 158 which control switchable contacts 160. The relay contacts 160 are adapted to connect power to the speakers 28 and 56 in the face badge reader 10 and the enclosure 18 so as to energize such speakers for two way conversation with the speaker 64 mounted on the controller 14.

Figure 8:
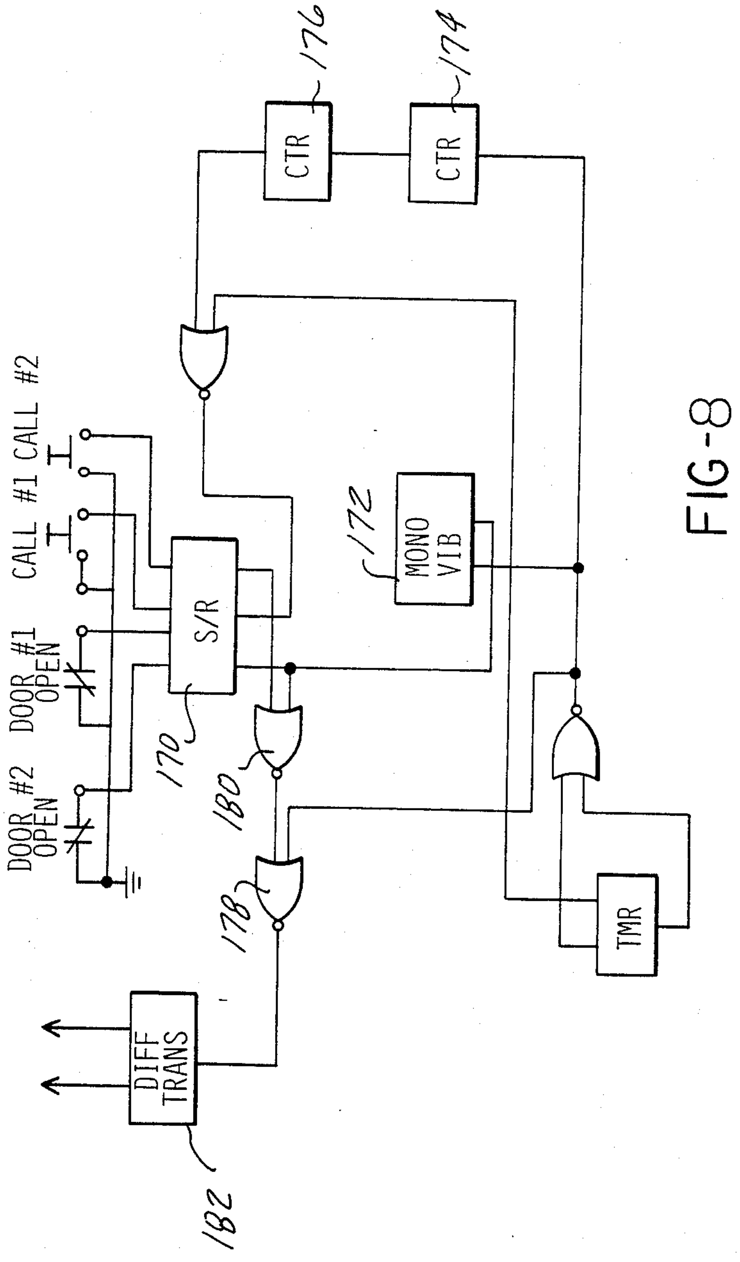
FIG. 8 is a block diagram of the face badge reader transmitter.

Finally, the face badge reader 10 includes digital transmitting means 67 which operates similar to the digital transmitting means 60 in the controller 14 for transmitting digitally coded signals corresponding to which control signal is input thereto, such as which door 20 and 22 in the enclosure 18 is open or which call button 30 at the doors has been activated indicating the presence of an individaul requesting entrance into the enclosure 18. As depicted in FIG. 8, the push buttons are input to a shift register 170 which converts the parallel inputs to a serial output. Upon the presence of a control input to the shift register 170, output pulses from a monovibrator 172 are input to counters 174 and 176 which provide a 256 count block of pulses. The data stored in the shift register 170 corresponding to which control input is present is clocked from the shift register 170 in a serial fashion through NAND gates 178 and 180 to a differential transceiver 182 which outputs the digitally encoded signals to the digital receiving means 61 in the controller 14.

As with the digital transmitting means 60 in the controller 14, the digital transmitting means 67 generates a 256 bit group of pulses, with only the first four bits, as shown in pulse train 109 in FIG. 5, being assigned to an input function. Thus, for example, bit 1 is assigned to the call push button 30 associated with the door 20 in the enclosure 18, bit 2 is assigned to the sensor 32 indicating the open or closed state of the door 20, etc.

Thus, there has been disclosed a unique security apparatus for controlling access to a pre-determined area which requires a minimum number of wiring connections between the face badge reader located at each building entrance and a remotely control unit. The minumum number of wire connections result from the use of transmitting and receiving means in the controller and face badge reader which communicate in a digitally encoded manner when command actions and control inputs are present. Furthermore, due to the use of digitally encoded transmitting and receiving means, the security apparatus of the present invention can be modified to include additional control features as well as controlling other building entrances without the need for an excessive number of wiring connections thereby minimizing costs and increasing the flexibility of the security apparatus of the present invention in controlling access to a pre-determined area, such as a building or factory.

What is claimed is:

1. A security apparatus for controlling the access of an individual having an identification badge bearing the individual's photograph through a first lockable closure into a pre-determined area comprising:

a face badge reader including:

first video scanning means for scanning and providing a video image of the individual confronting the first closure;

means for receiving the identification badge of the individual;

second video scanning means for scanning and providing a video image of the individual's photograph on the identificationbadge;

means for unlocking the first closure;

monitor means, connected to the first and second video scanning means, for displaying the video output of the first and second video scanning means;

control means connected to the face badge reader for controlling the first closure unlocking means;

first and second means for transmitting digital encoded signals, the first and second transmitting means being respectively associated with the face badge reader and the control means;

third and fourth means associated with the face badge reader and the control means for receiving digital encoded signals from the second and first transmitting means, respectively; and a two-wire pair connecting the first transmitting means and the fourth receiving means, and the second transmitting means and the third receiving means, respectively, for communicating digital encoded signals therebetween.

2. The security apparatus of claim 1 further including:

an enclosure having the first closure mounted therein for admitting an individual to the pre-determined area and a second lockable closure for controlling the access of the individual into the enclosure.

3. The security apparatus of claim 2 further including:

third video scanning means mounted within the closure for scanning and providing a video image of the interior of the enclosure.

4. The security apparatus of claim 1 wherein the face badge reader further includes:

means, responsive to control signals from the control means, of selecting at least one of the first and second video scanning means for output to the monitor means.

5. The security apparatus of claim 1 further including;

first and second speaker means mounted in the face badge reader and the control means, respectively, for transmitting and receiving audio signals therebetween.

6. The security apparatus of claim 2 further including:

speaker means located proximate with the second closure and connected to the face badge reader.

7. The security apparatus of claima 6 further including:

first and second speaker means mounted in the face badge reader and the control means; and audio switch means for selecting one of the first and third speaker emans for audio transmission.

8. The security apparatus of claim 6 further including:

individual address means, located proximate the second closure, for indicating the presence of an individual at the second closure requesting entry into the enclosure.

9. The security apparatus of claim 1 further including:

movable reflector means, mounted within the face badge reader and located proximate with the first video scanning means, for movably reflecting the image of the individual into the first video scanning means.

10. The security apparatus of claim 1 further including:

screen splitter means for displaying the output of the first and second video scanning means simultaneously side-by-side on the monitor means.

11. The security apparatus of claim 1 further including a plurality of video scanning means located at pre-determined locations in the pre-determined area.

12. The security apparatus of claim 1 further including:

output switch means, controlled by the control means, for energizing control devices mounted within the enclosure.

13. A security apparatus for controlling the access of an individual having an identification badge bearing the individual's photograph into a pre-determined area comprising:

an enclosure;

first and second lockable closures mounted within the enclosure;

speaker means and address means exteriorly adjacent each of the first and second closures;

a face badge reader mounted within the enclosure, the face badge reader including:

first camera means for transmitting an image of the individual confronting the face badge reader;

means for receiving an identification badge of the individual; and second camera means for scanning the identification badge and providing a video image of the photograph on the identification badge;

third camera means mounted within the enclosure for providing a video image of the interior of the enclosure;

first and second means for unlocking the first and second closures, respectively;

video selecting means for selecting at least one of the first, second and third camera means for the transmission of video signals;

monitor means, connected to the first, second and third camera means, for displaying the video output of at least one of the first, second and third camera means;

control means, connected to the face badge reader, for controlling the selection of the first, second and third camera means, the first and second closure unlocking means and the speaker means;

speaker means mounted in the face badge reader and the control means;

first and second means for transmitting digital encoded signals, the first and second transmitting means being respectively associated with the face badge reader and the control means;

third and fourth means associated with the face badge reader and the control means, for receiving digital encoded signals from the second and first transmitting means, respectively; and a two-wire pair connecting the first transmitting means and the fourth receiving means, and the second transmitting means and the third receiving mens, respectively, for communicating digital encoded signals therebetween.

14. The security apparatus of claim 1 wherein the digital encoded first and second transmitting means and the third and fourth receiving means transmitting signals serially between the face badge reader and the control means along the two wire pair.

* * * * *